(12) United States Patent
Finlay et al.

(10) Patent No.: US 12,497,991 B2
(45) Date of Patent: Dec. 16, 2025

(54) FASTENER ASSEMBLY SENSOR UNIT

(71) Applicant: SALUNDA LIMITED, Oxfordshire (GB)

(72) Inventors: Alan Patrick John Finlay, Ross-on-Wye (GB); Philip Samuel Pickles, Botley (GB); John Mark Newton, Abingdon (GB); Mathew William Davis, Stithians (GB)

(73) Assignee: SALUNDA LIMITED, Oxfordshire (GB)

( * ) Notice: Subject to any disclaimer, the term of this patent is extended or adjusted under 35 U.S.C. 154(b) by 311 days.

(21) Appl. No.: 18/245,229

(22) PCT Filed: Sep. 24, 2021

(86) PCT No.: PCT/GB2021/052483
§ 371 (c)(1),
(2) Date: Mar. 14, 2023

(87) PCT Pub. No.: WO2022/064206
PCT Pub. Date: Mar. 31, 2022

(65) Prior Publication Data
US 2023/0375029 A1  Nov. 23, 2023

(30) Foreign Application Priority Data

Sep. 25, 2020 (GB) .................................... 2015203

(51) Int. Cl.
*F16B 31/02* (2006.01)
*G01L 5/24* (2006.01)

(52) U.S. Cl.
CPC ................ *F16B 31/02* (2013.01); *G01L 5/24* (2013.01)

(58) Field of Classification Search
CPC ........ F16B 1/0071; F16B 31/02; F16B 31/04; F16B 37/00; F16B 37/04; G01L 5/24; G01L 5/243; Y10S 411/91; Y10S 411/917
(Continued)

(56) References Cited

U.S. PATENT DOCUMENTS

| 3,718,066 A | 2/1973 | Dally |
| 5,499,540 A | 3/1996 | Whaley et al. |

(Continued)

FOREIGN PATENT DOCUMENTS

| CA | 2890971 A1 | 11/2016 |
| DE | 102007015927 A1 | 10/2008 |

(Continued)

OTHER PUBLICATIONS

International Search Report and Written Opinion issued to International Application No. PCT/GB2021/052483, dated Dec. 8, 2021.

(Continued)

*Primary Examiner* — Tarifur R Chowdhury
*Assistant Examiner* — Akbar H. Rizvi
(74) *Attorney, Agent, or Firm* — MARSHALL, GERSTEIN & BORUN LLP; Michael P. Furmanek (57) ABSTRACT

A sensor assembly for a fastener assembly comprising a nut and a bolt comprises a sensor unit mounted in a cavity in the nut of the fastener assembly having an internal opening in the internal thread of the nut. The sensor unit comprises an optical flow sensor arranged to capture an image of the external thread of the bolt through the internal opening and to sense relative movement of the external thread of the bolt.

25 Claims, 9 Drawing Sheets

(58) Field of Classification Search
USPC .................. 411/8, 14, 427, 432, 436–437
See application file for complete search history.

(56) References Cited

U.S. PATENT DOCUMENTS

| | | | |
|---|---|---|---|
| 5,970,798 | A | 10/1999 | Gleman et al. |
| 6,204,771 | B1 | 3/2001 | Ceney |
| 7,156,595 | B2 | 1/2007 | Clarke |
| 7,441,462 | B2 | 10/2008 | Kibblewhite |
| 7,467,556 | B2 | 12/2008 | Kibblewhite et al. |
| 7,644,627 | B2 | 1/2010 | Kibblewhite et al. |
| 7,650,792 | B2 | 1/2010 | Kibblewhite |
| 7,698,949 | B2 | 4/2010 | Akdeniz et al. |
| 7,946,179 | B2 | 5/2011 | Kibblewhite et al. |
| 8,028,585 | B2 | 10/2011 | Kibblewhite |
| 8,033,181 | B2 | 10/2011 | Kibblewhite et al. |
| 8,037,772 | B2 | 10/2011 | Kibblewhite et al. |
| 8,427,329 | B2 | 4/2013 | Lev et al. |
| 8,448,520 | B1 | 5/2013 | Baroudi et al. |
| 8,591,157 | B1 | 11/2013 | Stewart et al. |
| 8,683,869 | B2 | 4/2014 | Herley et al. |
| 8,810,370 | B2 | 8/2014 | Tillotson et al. |
| 8,950,990 | B2 | 2/2015 | Dooner |
| 8,978,697 | B2 | 3/2015 | Hoppe et al. |
| 9,030,212 | B2 | 5/2015 | Karenowska et al. |
| 9,085,196 | B2 | 7/2015 | Dooner |
| 9,127,998 | B1 | 9/2015 | Guldiken et al. |
| 9,157,818 | B2 | 10/2015 | Schultz et al. |
| 9,483,674 | B1 | 11/2016 | Fink et al. |
| 9,524,634 | B2 | 12/2016 | Tillotson et al. |
| 9,587,657 | B2 | 3/2017 | Harrison et al. |
| 9,677,593 | B2 | 6/2017 | Hsieh |
| 9,810,525 | B2 | 11/2017 | Hashimoto et al. |
| 9,964,134 | B1 | 5/2018 | Tran et al. |
| 10,165,340 | B2 | 12/2018 | Tillotson et al. |
| 2006/0225511 | A1* | 10/2006 | Burmann ............... G01L 5/246 73/761 |
| 2013/0068031 | A1 | 3/2013 | Mekid et al. |
| 2015/0337884 | A1* | 11/2015 | Ceney .................. G01B 5/30 348/82 |
| 2017/0003118 | A1* | 1/2017 | Hashimoto ......... G01M 5/0041 |
| 2018/0067003 | A1* | 3/2018 | Michiwaki ............ G01L 5/0004 |
| 2019/0009746 | A1 | 1/2019 | Davis et al. |
| 2019/0139336 | A1* | 5/2019 | Lopes ................... G07C 5/0816 |
| 2020/0182672 | A1* | 6/2020 | Chen ........................ G06T 7/246 |
| 2022/0178399 | A1* | 6/2022 | Finlay ..................... G01P 13/00 |

FOREIGN PATENT DOCUMENTS

| | | |
|---|---|---|
| DE | 102008002609 A1 | 12/2009 |
| DE | 102016215202 A1 | 2/2018 |
| EP | 1579862 A1 | 9/2005 |
| EP | 2035217 A2 | 3/2009 |
| EP | 2175147 A1 | 4/2010 |
| EP | 2338032 A2 | 6/2011 |
| EP | 2524061 A1 | 11/2012 |
| EP | 2526702 A1 | 11/2012 |
| EP | 2574735 A1 | 4/2013 |
| EP | 2713137 A1 | 4/2014 |
| GB | 2495388 A | 4/2013 |
| GB | 2506424 A | 4/2014 |
| GB | 2506912 A | 4/2014 |
| SG | 10201501801 | 10/2015 |
| WO | WO-1998028548 A1 | 7/1998 |
| WO | WO-2000019179 A1 | 4/2000 |
| WO | WO-2006062524 A2 | 6/2006 |
| WO | WO-2007139834 A2 | 12/2007 |
| WO | WO-2009147385 A2 | 12/2009 |
| WO | WO-2011085863 A1 | 7/2011 |
| WO | WO-2011090539 A1 | 7/2011 |
| WO | WO-2013169639 A1 | 11/2013 |
| WO | WO-2017108051 A1 | 6/2017 |
| WO | WO-2017203220 A1 | 11/2017 |
| WO | WO-2018/007804 A1 | 1/2018 |
| WO | WO-2018093273 A1 | 5/2018 |
| WO | WO-2018134107 A1 | 7/2018 |
| WO | WO-2018134109 A1 | 7/2018 |
| WO | WO-2019/020972 A1 | 1/2019 |
| WO | WO-2019102222 A1 | 5/2019 |
| WO | WO-2019156712 A1 | 8/2019 |
| WO | WO-2020/193956 A1 | 10/2020 |

OTHER PUBLICATIONS

Patents Act 1977: Search Report under Section 17(5) for Application No. GB2015203.9 dated Mar. 3, 2021.
International Search Report and Written Opinion, issued in Application No. PCT/GB2020/050737, dated Jun. 4, 2020.

* cited by examiner

FASTENER ASSEMBLY SENSOR UNIT

CROSS-REFERENCE TO RELATED APPLICATIONS

This is the United States national phase of International Patent Application No. PCT/GB2021/052483, filed Sep. 24, 2021, which claims priority to Great Britain Patent Application No. 2015203.9, filed Sep. 25, 2020, the entire contents of each of which are hereby incorporated by reference herein.

FIELD OF THE DISCLOSURE

The present invention relates to a sensor unit for monitoring movement of a fastener assembly comprising a nut and bolt, particularly for fastener assemblies in safety-critical or inaccessible applications.

BACKGROUND

Fastener assemblies comprising a nut and a bolt are used to securely fastener wide ranges of objects in industry, including structures, wheels, beams and joists, disks, bearings, valves, flanges and plates, for example to assemble and retain the superstructure or crane on a ship, or a drilling derrick on an oil or gas rig. An array of fastener assemblies may be provided throughout a structure to securely join rigid members such as beams, cranks, wheels or plates. Fastener assemblies may be used to secure joints between the sections of rail, beams or joists. The bolts are provided with nuts as part of assemblies mounted to the structures.

Fastener assemblies are routinely inspected to ensure the rigidity and mechanical integrity of structures. Fastener assemblies deteriorate in a variety of ways. For example, vibration may cause nuts or bolts to loosen and environmental exposure causes corrosion and disintegration of fastener assemblies. Stress may cause bolts to fatigue and shear, and strain may cause bolts to elongate, crack and fail. If a fastener assemblies is erroneously opened and a rigid member, such as a beam, is present then it may fail with catastrophic consequences and even fatalities. In a derrick, for example, excessive vibration due to drilling, jarring or stuck pipe can cause failure of structural elements such as elevator rails. Occasionally a fastener assemblies is loosened due to excessive and prolonged vibration with disruptive and serious consequences such as failure of a mechanical member, and a falling object.

By way of example, fastener assemblies may be used in the context of the oil industry in risers. Such risers are assembled from large sections of tubular and used to connect well-heads with platforms. Platforms can include production platforms, floating production and storage offshore (FPSO) vessels, mobile offshore drilling units (MODU) such as drill-ships, semi-submersibles or jack-ups. The riser sections are tubulars, for example pipes manufactured from steel, alloy or composite, that conduct formation fluids to the surface, or, during drilling, conduct drilling fluids to or from the well-bore. In injection wells, risers may be deployed to inject fluids into the formation. Risers may connect networks of flow-lines and manifolds from multiple wells. Risers come in various dimensions and specifications and can include large sections for submarine deployment at high pressure. When assembled, riser sections are stacked and sealed flanges couple sections of riser into continuous conduits that covey fluids at pressure and preserve the integrity of the well and of the platform. Therefore, the condition of each section riser is critical and sections of riser are routinely inspected for defects, corrosion and leaks. The thickness, and condition of the fastener assemblies, are of particular importance. Non-destructive inspection (NDT) techniques, visual inspection and record-keeping are among the methods used for recording and validating the integrity of connections. Various measurements, such as bolt cross section thickness, surface condition and manual records may be used in calculations and models to analysis the condition and integrity of riser bolts. These methods may form part of special periodic service (SPS) or regulatory regimes to verify riser integrity and the safety of operations. For example, a record may be kept for each section of riser including logs for deployment underwater, tallies including depth and duration of deployment.

To validate the integrity of structures, routine inspection of fastener assemblies may be obligatory and is frequently conducted in accordance with standards from industry bodies such as API, NAS, ASME, ASTI, BSEE. Similarly, inspection and testing may be required as part of obtaining or maintaining vessel class or type approval with organisations such as DNV-GL, ABS (American Bureau of Shipping) or Lloyds Register. Bolts and fastener assemblies are used subsea temporarily and permanently. For example, fastener assemblies securing sections of lower marine riser packages, and BOPs (blowout preventers), may be inspected routinely as part of maintenance and verification during and between operations. This need to confirm the integrity of fastener assemblies on joints in the structure is crucial.

Manual inspection by teams of specialists may include performing various tests of torsional rigidity and torque. These inspections are continuous during the lifetime of an offshore structure, be it a platform or mobile offshore drilling unit (MODU). These inspections can be labour intensive, hazardous and time-consuming requiring extensive training and safety precautions. Teams of technicians will manually inspect a structure and perform tests on fastener assemblies for torque and rigidity by means of rope-access, or ladders or using a cherry-picker or otherwise, in often dangerous conditions. The technicians are exposed to weather, dropped objects, and other hazards from working at height. Interruptions to operations can be costly causing delays to the critical path of a drilling programme or production schedule. These serious incidents have created a requirement for a solution that can remotely, and without manual inspection by means of rope access or interruption of service and downtime for example, detect and confirm the status of a fastener assembly in the derrick or on equipment.

Accordingly, it would be desirable to reduce the necessity for manual inspection of fastener assemblies, thereby improving worker and operational safety, and reducing delays due to inspections.

GENERAL DESCRIPTION

According to an aspect of the invention, there is provided a sensor assembly for a fastener assembly comprising a nut and a bolt, the sensor assembly comprising: the nut of the fastener assembly, the nut having an internal thread for screwing onto an external thread of the bolt and a cavity; and a sensor unit mounted in the cavity in the nut, the sensor unit comprising an optical flow sensor arranged to capture an image of the external thread of the bolt and to sense relative movement of the external thread of the bolt when the internal thread is screwed onto the external thread of the bolt.

Thus, the sensor unit is integrated into the nut of the fastener assembly, in particular by being mounted in a cavity within the nut. The sensor unit includes an optical flow sensor that captures an image of the external thread of the bolt and senses relative movement of the external thread of the bolt based on optical flow, which is indicative of loosening of the fastener assembly. Optical flow sensors are well-developed and provide a reliable method for detecting movement. In the present case, relative movement of the nut and bolt is perpendicular to the optical axis of the sensor, to which optical flow sensors are particularly sensitive. In this way, the sensor assembly has the advantage of enabling a reduction in the frequency of manual inspection, and allowing technicians to be directed to maintain certain fastener assemblies based on analysis of data and trends, predictive maintenance and critical changes in status. Benefits include reduced labour costs, defrayed expenses, minimised HSE risk and fewer interruptions of operations for scheduled maintenance.

The fastener assembly may be applied in any application, including those discussed above.

In some embodiments, the sensor unit further comprises a processor arranged to process an output of the sensor to detect loosening of the fastener assembly and to output a status signal representing the status of the fastener assembly. By providing an integrated processor in the sensor unit, a simple status signal can be generated and transmitted by the sensor unit. This will be more robust and less prone to data loss than transmitting the output of a sensor directly.

In some embodiments, the sensor unit further comprises a wireless communication unit arranged to communicate the status signal. Communicating wirelessly is particularly advantageous when the sensor unit is mounted in an inaccessible or remote location.

Advantageously, the cavity may have an internal opening in the internal thread of the nut, and the optical flow sensor may be arranged to capture an image of the external thread of the bolt through the internal opening in the internal thread of the nut. This is a convenient construction for the sensor assembly, because it provides robust and reliable sensing of the external thread of the bolt.

Advantageously, the area of the internal opening is as large as possible to permit imaging of a relatively large area of the external thread of the bolt. By increasing the area, the frame rate needed to detect relative movement is decreased, thereby reducing the power consumption of the sensor units. This is particularly important, because the sensor units have a battery that has a finite energy capacity. To achieve this effect, in some embodiments the internal opening in the internal thread of the nut has an area of at least 0.5 cm$^2$, preferably at least 1 cm$^2$.

In some embodiments, the cavity has an external opening in a peripheral face of the nut. This facilitates mounting of the sensor unit in the nut and is advantageous in the case that sensor unit comprises a wireless communication unit, such as a radio communication unit, because the external opening facilitates the wireless communication.

Advantageously, the sensor unit protrudes from the external opening. This increases the size of the sensor unit that may be mounted on a nut of a given size and assists the wireless communication in the case that sensor unit comprises a wireless communication unit.

In some embodiments, the cavity comprises an inner section and an outer section having a greater cross-sectional area than the inner portion.

Advantageously, the cavity may be a machined cavity. This facilitates formation of the cavity in the nut.

Typically, the nut may be of size M20 or greater.

The optical flow sensor may comprise an image sensor that captures the image of the external thread of the bolt and optionally a lens that focuses the image of the external thread of the bolt thereon. The image sensor may be of any suitable type, for example a CMOS (complementary metal-oxide-semiconductor) image sensor or a CCD (charge coupled device) sensor. The image sensor may be sensitive to any frequencies of light, for example visible light and/or infrared light.

Advantageously, the image sensor has a global shutter, in preference to a rolling shutter which is another alternative. In the present application, as the entire frame is captured at the same instant, the use of a global shutter reduces issues caused by vibration and shudder which are particularly acute in the typical industrial applications of the sensor assembly.

Advantageously, the sensor unit further comprises a light source arranged to provide illumination through the internal opening in the internal thread of the nut. This facilitates the capture of an image of the external thread of the bolt.

Advantageously, the sensor unit further comprises a diffuser arranged in front of the light source. This has the advantage of distributing the emitted light over the target surface.

In some embodiments, the sensor unit further comprises a further optical flow sensor arranged to capture an image of an object outside the nut and arranged to sense relative movement of the object. Such relative movement of the nut with respect to another object is also indicative of loosening of the fastener assembly. Thus, this improves the sensing for example by providing sensing of rotation of the entire fastener assembly that may occur without relative rotation of the nut and bolt. Advantageously, the further optical flow sensor supplements the optical flow sensor that senses the thread, although in some embodiments the sensor unit may include only the further sensor unit.

Advantageously, the further optical flow sensor is directed axially of the internal thread of the nut. In that case, the object may be an object fastened between the nut and the bolt when the internal thread is screwed onto the external thread of the bolt.

Various mounting arrangements are possible.

BRIEF DESCRIPTION OF THE DRAWINGS

Embodiments of the present invention will now be described by way of non-limitative example with reference to the accompanying drawings, in which.

DETAILED DESCRIPTION

A fastener assembly 1 is shown in FIGS. 1(a) to 1(d). The fastener assembly 1 fastens two plates 2 to form a joint. The fastener assembly 1 comprises a bolt 3 and a nut 4.

The bolt 3 comprises a shaft 5 having an external thread 6 that is inserted through apertures 6 in the two plates 2. The bolt 3 also comprises a head 7 that acts as an engagement portion to engage one of the plates 2, with a washer 10 provided therebetween.

The nut 4 has an annular shape and comprises an internal thread 9 (visible in FIG. 2) that is screwed onto the external thread 6 of the bolt 3. The nut 4 acts as an as an engagement portion to engage the other one of the plates 2 from the head 7 of the bolt 3, with a washer 10 provided therebetween.

Figure 2:
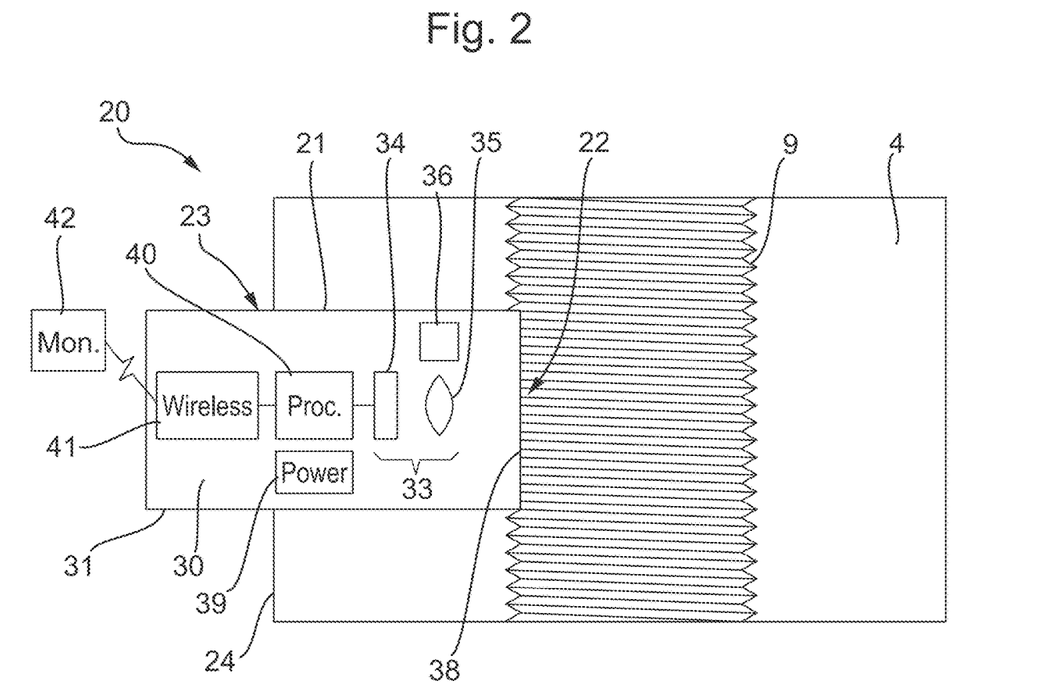
FIG. 2 is a cross-sectional view of a sensor assembly comprising a nut of a fastener assembly having a sensor unit mounted therein, the sensor unit being shown schematically.

As shown in FIG. 2, a sensor assembly 20 is formed by mounting a sensor unit 30 in the nut 4. The sensor unit 30 senses loosening of the nut 4 as described below.

Figure 1A:
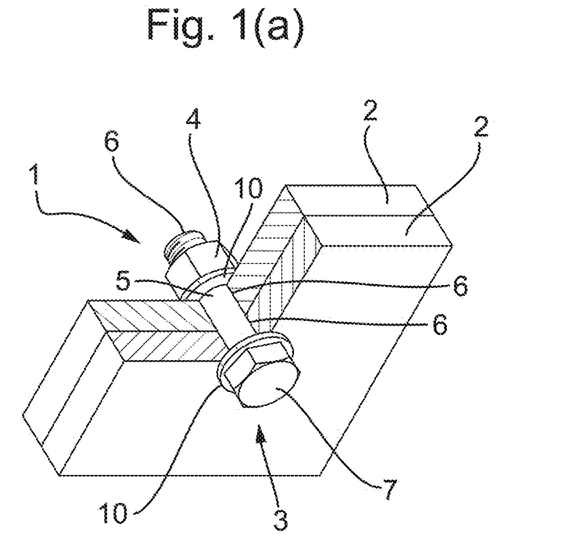
FIGS. 1(a) to 1(d) are views of a fastener assembly, FIG. 1(a) being a cut-away perspective view, FIG. 1(b) being a side view, FIG. 1(c) being a perspective view, and FIG. 1(d) being a plan view.
Figure 1B:
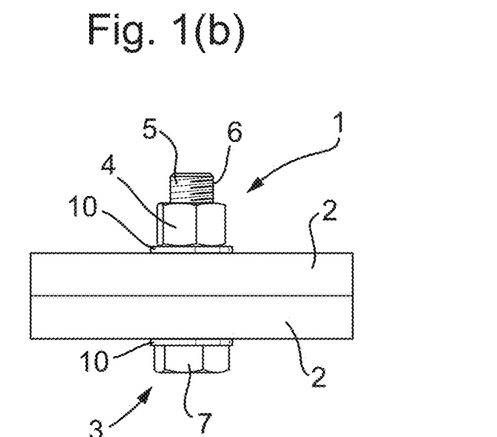
Figure 1C:
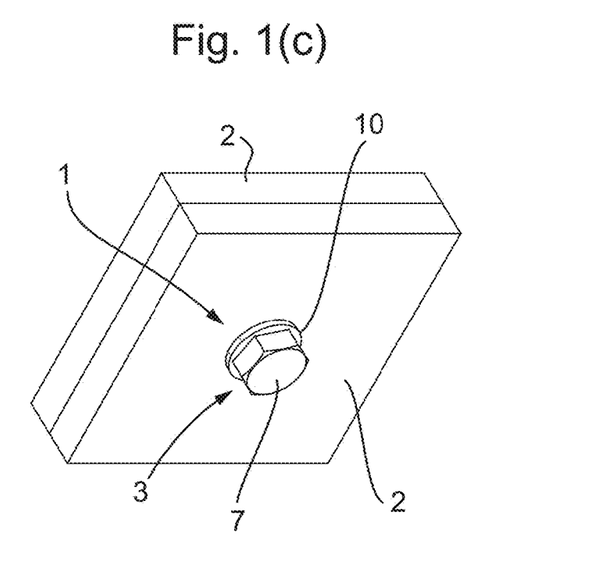
Figure 1D:
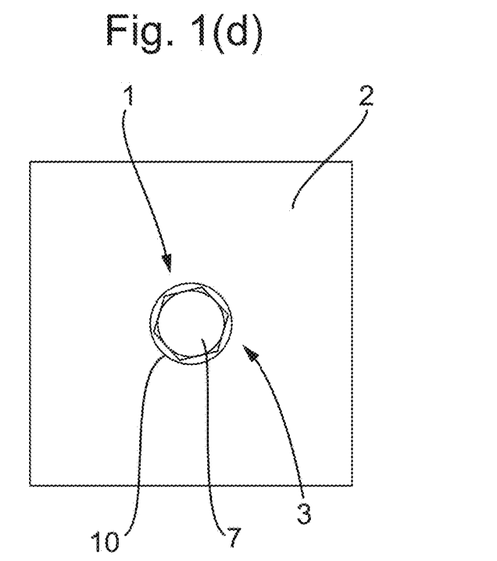

The plates 2 are the fastened object in this example. More generally, the fastener assembly 1 may be used to fasten any object, including the examples given above and the following examples.

The sensor assembly 20 could be deployed wherever fastener assemblies 1 are critical to integrity of fastener assemblies 1. Some non-limitative examples are as follows.

The sensor assembly 20 may be applied in difficult to inspect joints such as wind turbine blades, pylons, monopiles, railway joints, subsea bolts, subsea risers, subsea Christmas trees (x-trees), surface x-trees, choke lines, on fastener assemblies or connections and flanges used in flammable atmospheres such as hydrocarbon processing, throughout hydraulic fracturing fleets, lower marine riser packages or jackets. In particular, failure of H4 bolts used on subsea drilling risers and lower marine riser packages can lead to leaks of drilling fluids and hydrocarbons or catastrophic loss of well control and a blow-out. The sensor assembly 20 may be exploited as a monitoring system for a section of drilling or production riser. The sensor assembly 20 may be utilised wherever fastener assemblies 1 are critical and frequently made and broken such as on bolts connection sections of drilling riser.

In operational use the sensor assembly 20 may eliminate the need for a spotter in the derrick checking for loose joints, bolts and fastener assemblies that are considered a DROPS risk. The sensor assembly 20 could be used to track the status of a fastener assembly 1 in service on a critical structure, flange, plate, joint, valve, pipework or machine and its output used in feedback to plan and direct maintenance and prevent failure in a timely fashion.

The sensor assembly 20 may be applied to fastener assemblies 1 that are particularly critical, such as in hydrocarbon processing or high-pressure vessels or flammable atmospheres, or in locations that are difficult to reach, such as subsea risers or wind turbine blades. Equally, the sensor assembly 20 may be applied to fastener assemblies 1 that are frequently made and broken, such as on connections for subsea drilling risers. The sensor assembly 20 may be applied to monitoring of structures within the derrick that experience high shock, vibration or strain such as bolts securing guide rails for top-drives. Similarly, the sensor assembly 20 may be applied to fastener assemblies 1 on linkage mechanisms of a top drive, or on wheels or rotating machines, or on flanges, to confirm the status, integrity and condition of the equipment, rotating machinery and pipework, and to avoid dropped objects or failures of equipment in service inside the derrick or around an installation. Likewise, the sensor assembly 20 could be used to monitor fastener assemblies 1 and to demonstrate compliance with API recommended practice 4G for operation, inspection, maintenance and repair of drilling and well servicing structures, and 4F for drilling structures.

The sensor assembly 20 may be applied in transportation applications.

In the context of transportation, fastenings are frequently inspected for tightness, torque, corrosion, and cracking. Inspection may be visual and rely on chalk marks or other visual indicators or tell-tails, or manual and rely on using a wrench or tool to check the tightness and torque of a fastening. Lorries and other heavy vehicles consume tires and therefore fastenings are frequently made and broken, for example wheel nuts are regularly done and undone and need to be checked for tightness. Similarly, rolling stock such as railway carriages and locomotives have critical fastenings on bogies and axials. Frequent inspection is required for safety purposes and is conducted as part of planned maintenance.

In the case of a bogey, there are two axial ends on each bogey which are attached by at least four bolts. Problems may arise when fastener assemblies are under, or over, tightened leading to failure in service. Many of these fastener assemblies are in hard to access locations and therefore a wireless sensor has particular benefit in providing remote monitoring the tightness of fastener assemblies. There are at least two bogies on each coach or carriage, so a substantial amount of manual inspection is required which may be eliminated by the remote monitoring provided by the sensor assembly 20. The sensor assembly 20 may provide value in the event of detection if a bolt is loose before it fails, is ejected or falls off, thereby avoiding an incident and permitting preventative maintenance in the field or recall of the vehicle or carriage.

The sensor assembly 20 may be applied to under-vehicle equipment, and equally to critical points on the alignment or railway such as spreader bars, points, ballast, linkages, bridge bolts, clamps, ties, fish plates and sleepers.

Other sensor assembly 20 that may be monitored include catenary bolts & rivets and rail anchors.

On heavy vehicles and mining vehicles and conveyor belts the sensor assembly 20 may be used to monitor wheel nuts.

The sensor assembly 20 may be applied to wind turbines. Similar requirements exist for remoting monitoring of fastener assemblies, or components of fastener assemblies, on wind turbines, particularly in inaccessible locations such as offshore or remote locations on land. Fastener assemblies on wind turbines include anchor bolts, tower bolts, transition bolts, slew ring bolts (also on cranes) and axial turbine blade bolts all of which see cyclical loads over prolonged service lives of twenty years or more. Other fastener assemblies which may be monitored by the sensor assembly 20 include foundation bolts, anchor rods; rotor blades; tower segment bolts; rotor bearings; difficult to access bolts and anchor chains.

The sensor assembly 20 may be applied to fastener assemblies on cranes, such as tower bolts, slew ring bolts, fastener assemblies on critical joints, gantries and booms.

Depending on the requirements of the application, the nut 4 may be made from a metal, such as steel, or may be made from non-metallic material, such as plastic, composite materials, laminate or carbon fibre.

The sensor unit 30 is mounted in the nut 4 as follows. The nut 4 includes a cavity 21 having an internal opening 22 in the internal thread 9 of the nut 4 and an external opening 23 in a peripheral face 24 of the nut 4. The cavity 21 extends between the internal opening 22 and the external opening 23. The cavity 21 may be machined after formation of the nut 3, using any suitable machining process. This is convenient for manufacture, although in principle the cavity 21 could formed in another manner. The sensor unit 30 is mounted in the cavity 21 in the nut 4. The sensor unit 30 may be easily inserted through the external opening 23. Various options for fixing the sensor unit 30 in place in the cavity 21 are described below.

Figure 3:
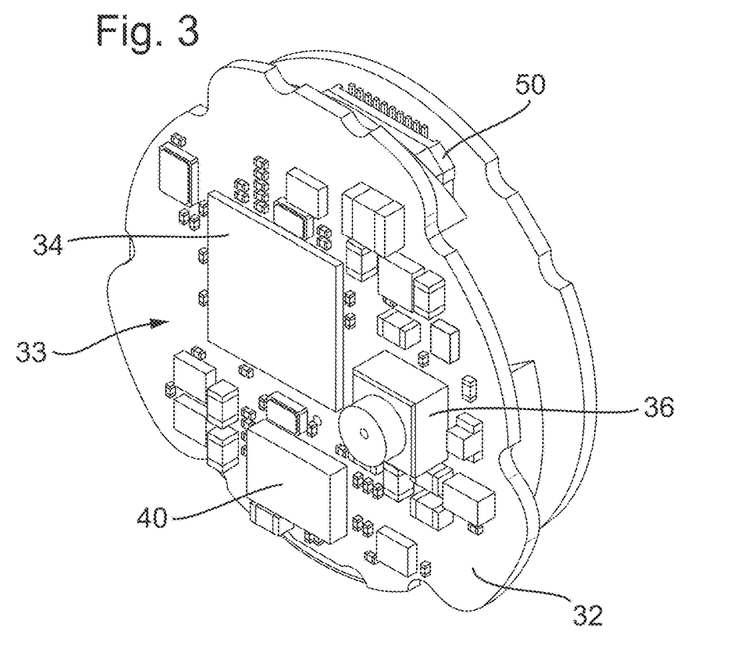
FIGS. 3 and 4 are a perspective view of internal components of the sensor unit in two alternative configurations.
Figure 4:
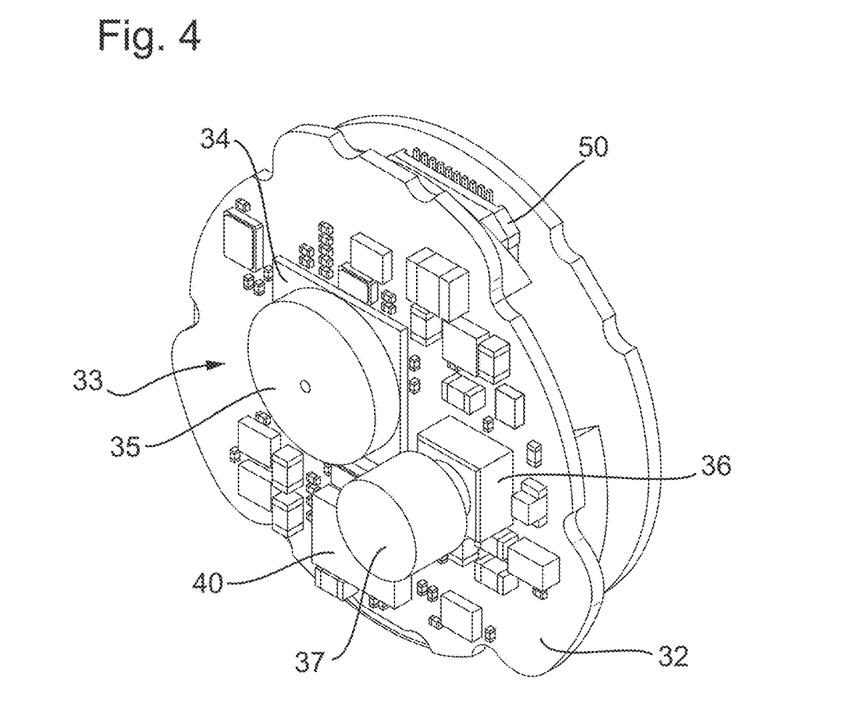

The sensor unit 30 comprises a housing 31 housing various internal components shown schematically in FIG. 2 that will now be described. FIGS. 3 and 4 show two alternative configurations for the internal components which are mounted on a circuit board arrangement 32.

The sensor unit 30 comprises an optical flow sensor 33 that includes an image sensor 34 that is arranged to capture an image of a part of the external thread 6 of the bolt 3 through the internal opening 22 in the internal thread 9 of the nut 4, when the internal thread 9 of the nut 4 is screwed onto the external thread 6 of the bolt 3. The image sensor 34 may be of any suitable type, for example a CMOS image sensor or a CCD sensor. The image sensor 34 may be sensitive to any frequencies of light, for example visible light and/or infrared light.

The image sensor 34 may have a global shutter or a rolling shutter, but a global shutter is advantageous to reduce issues caused by vibration and shudder as the entire frame is captured at the same instant.

The optical flow sensor 33 may further comprise a lens that focuses the image of the external thread 6 of the bolt 3 on the image sensor 34, but this is optional and omitted in the configuration of FIG. 3.

The sensor unit 30 further comprises a light source 36 arranged to provide illumination of the part of the external thread 6 of the bolt 3 through the internal opening 22 in the internal thread 9 of the nut 4. This illumination facilitates the image capture. The light source 36 may be of any suitable type, for example a light emitting diode (LED) or a solid-state laser.

The sensor unit 30 may further comprise a diffuser 37 arranged in front of the light source 36. The diffuser 37 distributes the illumination over the part of the internal thread 9 of the nut 4 visible through the internal opening 22.

The sensor unit 30 may be sealed by one or more windows 38 that extend across the internal opening 22 in the internal thread 9 of the nut 4 when the sensor unit 30 is mounted. The windows 38 are transparent in order to transmit light for imaging.

The optical flow sensor 33 senses movement of the external thread 6 of the bolt 3 relative to the nut 4. An optical flow sensor is a vision sensor capable of measuring optical flow or visual motion and outputting a measurement based on optical flow. In particular, images sequentially captured by the image sensor 34 are processed to measure relative movement based on change in the surface features in the field of view. Such surface features may be discontinuities or roughness on the shaft 5, or may be edges of the external thread 6 itself. As relative movement of the nut 4 and bolt 3 is perpendicular to the optical axis of the image sensor 34, the optical flow sensor 33 is sensitive to such movement. Optical flow technology is widely used in optical mice with personal computers and is beginning to be used in drones and other autonomous flight machines because of widespread availability of generic, cheap, low-power consumption optical flow technology components and devices.

The frame rate of the image sensor 33 may be relatively slow, with the period between image capture being hours, days or even up to weeks or even months apart, since changes in the tension of the fastener assembly 1 are likely to be very gradual. Such a slow frame rate is advantageous for minimising power consumption. Alternatively, the image capture frequency may be adjusted or intermittently triggered dynamically based on shock, vibration, motion, changes in magnetic flux, conductivity, pH, or changes in orientation detected by accelerometers, gyroscopes or inertial measurement units (IMUs).

The optical flow sensor 33 may be used to detect changes in fastener tension and confirm tension meets a specified threshold. Likewise, the optical flow sensor 33 may be utilised to detect changes in stress, strain or distortion. The image sensor 34 may be utilised to monitor the external thread 6 of the bolt 3 for discolouration and surface quality as an indication of corrosion and degradation.

The optical flow sensor 33 may be an application specific device that incorporates MEMS accelerometers, gyroscopes, Hall effect sensors and processing on the same die.

The sensor unit 30 further comprises a processor 40 that processes the output of the optical flow sensor 33 to detect loosening of the fastener assembly 1. The processor 40 outputs a status signal representing the status of the fastener assembly 1, for example whether it is secure or loose.

Tiny movements of the fastener assembly 1 may be detected and used to trigger warnings of nascent changes in integrity of a fastener assembly 1. A small change or rotation of the fastener assembly 1, of even one tenth degree of angular rotation, may be an indicator of nascent failure, reduced torque, cracking, corrosion or loss of rigidity. A threshold may be implemented to determine status, for example if the axial rotation exceeds a certain number of degrees or radians. Likewise, the sensor unit 30 may incorporate additional sensors to measure tension, torque, hardness, conductivity, corrosion, magnetic flux, shear, strain, load cells, compression, tilt, angular orientation, distortion and vibration.

The processor 40 may include memory to record measurements and provide an electronic log for validation and inspection of riser condition. The processor 40 may execute software to analyse the output of the optical flow sensor 33 and determine status.

The sensor unit 30 further comprises a wireless communication unit 41 that communicate the status signal, allowing for the sensor assembly 20 to be used in remote locations without the need to make a wired electrical connection. The wireless communication may be encrypted.

The wireless communication unit 41 may be a radio communication interface arranged to communicate using radio frequency electromagnetic (EM) waves. The wireless communication unit 41 may be used to wirelessly communicate the status signal to a monitoring system 60 under the control of the processor 40. The sensor unit 30 may communicate wirelessly using the network protocol described in WO2019/020972.

The wireless communication unit 41 may utilise radio-frequencies. Optionally, a frequency may be selected that has a wavelength that does not suffer from attenuation or reflections from pipes and tubulars stacked or stored on the deck or in the yard. To minimise reflections and loss of signal, a radio frequency may be selected that has a wavelength that is less than the minimum spacing between tubulars when stacked in storage. This minimum spacing will be determined by the minimum pitch between the riser sections 5. An embodiment for a sensor unit 30 with a mounting advantageously utilises a wireless communications frequency that has a wavelength that is less than the minimum spacing between risers. The frequency selected should not interfere with marine communications equipment, Optionally, the frequency selected may be between 1 kHz and 3 GHz.

The radio communications frequency may be long-wave, or at a frequency suitable for transmission over long distances when location of a section of riser, and remotely determining its condition, is desirable.

More generally, the wireless communication unit 41 may communicate with the monitoring system 42 wirelessly by any optical, sonic, or electromagnetic means. For example, the wireless communication unit 41 may be a light source (not shown), such as a LED, to provide a visual indictor, or by optically by means of LiFi, or an RF communications interface relying on proprietary or commercially-available protocols such as Bluetooth, Bluetooth low energy (BLE), LORA, 4G, 5G, ZigBee or WIFI. Optical communication may be detected by a camera or photodiode to detect modulated light. LIDAR, time of flight cameras, time of flight radio may be used to locate the sensor units 10 and detect coarse changes in their orientation or behaviour.

Alternatively, for underwater communications, the wireless communication unit 41 may comprise ultrasonic transducers. In this case, the status signal may be relayed from a sensor unit 30 to the surface, or via adjacent units.

The monitoring system may have a similar configuration to the monitoring system 42 for latches of a fingerboard latch system as disclosed in WO-2018/007804 and/or may be interface with an OEM control system for an industrial site. The monitoring system 42 provides an indication of the status of the fastener assemblies 1 to a user, for example on a display or audibly. The monitoring system 42 may provide a warning when the status of any fastener assembly 1 is loosened or otherwise in a dangerous state.

Accordingly, changes in the status, functionality, behaviour, condition or safety of critical fastener assemblies may be monitored from a controller in the monitoring system 42 and used as feedback to control, slow-down or interlock equipment used during operations to prevent dropped objects or other incidents arising from failure of a fastener assembly 1 such as a loose bolt or nut in a critical location. Likewise, the sensor unit 30 could be used to monitor the status of critical bolts or screws, and to interface with an OEM control system, such as the monitoring system 42, and communicate the status of fastener assemblies 1. Changes in the status of fastener assemblies 1, for example beyond a threshold, may be used to interlock machinery to ensure that equipment is not operated until the fastener assembly 1 is securely tightened or replaced.

The monitoring system 42 may control, collect, analyse, trend and display data from multiple sensor unit 30 mounted, attached or clamped onto critical fastener assemblies 1 around a structure or rigid member. Data from multiple sensor units 30 on multiple fastener assemblies 1 may be collected, processed, and analysed remotely to detect trends, predict failure, and generate reports and recommendations. The device of the invention may generate data on shock, vibration and service history for analysis and to determine operational performance and mean time between failures. This feedback may be monitored to schedule recall of equipment, for example a vehicle, or preventative action in a field such as an emergency service.

In the case of vehicles, trends may be correlated with service history, service location, vehicle type, operational history and routes taken. Statistical analysis of data from fastener assemblies 1 may determine root causes of failure modes, detect human error and permitting operators or service companies to take preventative action through changing training methods, tools, HSE and service protocols and/or rostering of personnel etc. The data may be plotted with respect to fastener assembly size, type, carriage or vehicle type or model, failure rates per day, failure rates per carriage or per bogey or per depot and failure per routing, and correlated with other methods or environmental factors such as temperature, materials, humidity, salt spray, corrosion, shock, or vibration. Changes in these or other environmental factors may be used to trigger a measurement or several measurements of a minute changes (or microslip of bolted joint) in the axial rotation of the fastener assembly 1 or a component of the fastener assembly 1 to detect looseness.

In any application, notably including cranes, fastener assemblies 20 may be monitored remotely to ensure adherence to standards and HSE protocols.

Wireless communication from the wireless communication unit 41 is facilitated by the cavity 21 having an external opening 23 in the peripheral face 24 of the nut 4 and moreover by the sensor unit protruding from the external opening 23.

The sensor unit 30 also includes a power source 39 for powering the electrical components. In general terms, the power source 39 may be any type of standalone power source known in the art that is capable of providing power to the sensor unit 30 including the sensor and other components such as the processor 40 and wireless communication unit 55.

For example, the power source 39 may comprise a battery, solar cell or capacitor. The power source 39 may optionally comprise an energy harvesting device that is configured to harvest energy from environment of the riser assembly 2. For example, the power source may be configured to harvest energy from the motion, shock or vibration of the riser section 5. The power source 39 may be provided integral with the sensor unit 30, or removably attached to the sensor unit 30. A sensor unit 30 that is easily maintained for long periods of deployment may thus be provided. Integrated processing circuits may be implemented with the optical flow sensor 33 to minimise power consumption.

The power source 39 may be a battery with long life characteristics. Such a battery is ideally compact in format and can fit within the sensor unit 30 mounted to the riser arm by the mounting. To avoid frequent replacement of the sensor unit 30, a battery used as the power source 39 ideally will have sufficient capacity to power the sensor unit 30 for tens of thousands of riser cycles over several years (e.g. five years between SPS). Optionally, such a battery may be a lithium thionyl chloride battery that has been selected and configured to last the lifetime of the equipment. The power source 39 may comprise a battery supplemented with a supercapacitor for storing and releasing charge, e.g. for broadcast of information wirelessly by radio or by means of modulated light signal.

The sensor unit 30 is capable of being run for extended periods of time from a the remote power source 39. Energy scavenging may be exploited to generate power and to supplement power from a battery or supercapacitor. Energy may be harvested from mechanical noise, vibration, shock, solar energy, pneumatic lines and pressurised air, hydraulic lines or thermal sources and thermal gradients (e.g. using a Peltier and heat sink).

Typically, the nut 4 is of size M20 or greater, in order to easily accommodate the sensor unit 30. However, the nut 4 may be smaller if the sensor unit 30 is correspondingly miniaturised.

Typically, the area of the internal opening 22 is as large as possible to permit imaging of a relatively large area of the external thread of the bolt. By increasing the area, the frame rate needed to detect relative movement is decreased, thereby reducing the power consumption of the sensor unit 30. Typically the internal opening 22 in the internal thread 9 of the nut 4 has an area of at least 0.5 cm$^2$, preferably at least 1 cm$^2$.

The sensor unit 30 and its housing 31 may be fabricated from a tough, durable material to withstand shock, vibration, temperature extremes, ice, direct sunlight, UV degradation and washing with a high-pressure jet of water at over 200 Psi. The housing 31 may encapsulate the internal components and may be formed from a suitable material that is resistant to external fluids in the vicinity of the fastener assembly, for example drilling fluids, brine, cement, sunlight, UV radiation, grease, pipe dope, iron filings and other debris.

Advantageously, the material of the housing 31 may be polyether ether ketone (PEEK), which is a plastic and is chemically inert. In particular, grades of PEEK that include carbon such as TECAPEEK black, and TECAPEEK CF30 black (manufactured by Ensinger, UK) and that use Victrex PEEK 450G as the base component. These grades of PEEK may be welded to seal the sensor unit 30 and provide IP67 or IP68 water-proofing as well as certification to IECEx and ATEX standards for use in flammable atmospheres.

Suitable materials of the housing 31 also include carbon fibre, fibreglass, polyaryletherketone (PAEK), PEEK reinforced with carbon fibre and other engineering thermoplastics and composites or elastomers.

The housing 31 mounting may be a suitable composite, such as carbon fibre or fibre glass, or a plastic, or an elastomer, for example a rubber. The sensor unit 30 may also incorporate non-metallic lining materials to provide additional friction, integrity and sealing to keep out oils and debris. The non-metallic materials used in the sensor unit 30 may be of a type known to be suitable for use as a lining of a in oil and gas applications. Suitable materials for the non-metallic lining in the sensor unit 30 can include, without limitation: polyisoprene, styrene butadiene rubber, ethylene propylene diene monomer rubber, polychloroprene rubber, chlorosulphonated polyethylene rubber, 'Viton' or nitrile butadiene rubber. The material may also be a mixture of these and/or other materials.

The housing 31, or at least parts of the housing 31 protruding from the nut 4 may be manufactured from composite, non-metallic, laminate or partially non-metallic materials in order to permit the transmission and reception of EM radiation, where EM radiation is used for the wireless communication.

There will now be described some specific examples of the sensor assembly 20 illustrating different configurations for mounting the sensor unit 30 in the nut 4.

FIGS. 5(a) to 5(e) show a first specific example of the sensor assembly 20.

In this example, the cavity 21 comprises an inner section 25 and an outer section 26 having a greater cross-sectional area than the inner section 25, the housing 31 of the sensor unit 30 having an inner part 27 fitting within the inner section 25 and an outer part 28 fitting within the outer section 26. Thus, the inner section 25 extends towards the internal opening 22 of the internal thread 9 of the nut 4 and the optical flow sensor 33 captures an image of the internal thread 9 through the inner part 28 of the housing 31.

In this case, the sensor unit 30 is fixed to the nut by plural bolts 51 that are fixed to the peripheral face 24 of the nut 4 in which the external opening 23 of the cavity 21 is formed, outside the external opening 23. The bolts 51 may be locked in place by anti-vibration locking washers. Four bolts 51 are shown, but any number of bolts 51 could be used in practice. More generally, the bolts 51 could be replaced by any mechanical fixing fixed to the peripheral face 24 of the nut 4.

Figure 5A:
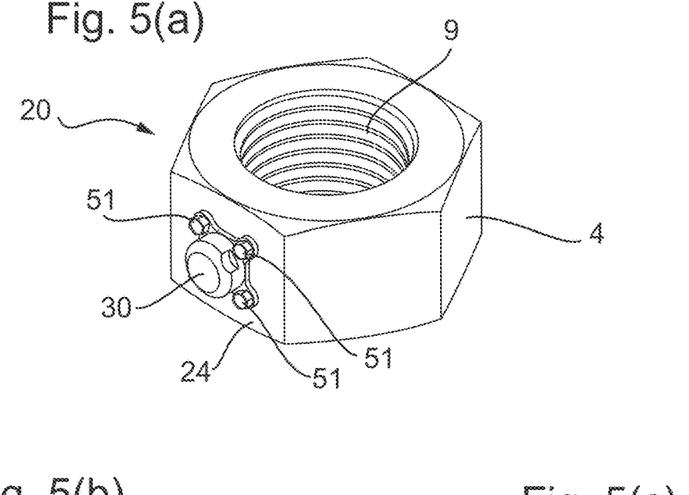
FIGS. 5(a) to 5(e) are views of a first specific example of the sensor assembly, FIG. 5(a) being a perspective view, FIG. 5(b) being a side view, FIG. 5(c) being a front view, FIG. 5(d) being a plan view, and FIG. 5(e) being a cross-sectional view taken along line z-z in FIG. 5(d)
Figure 5B:
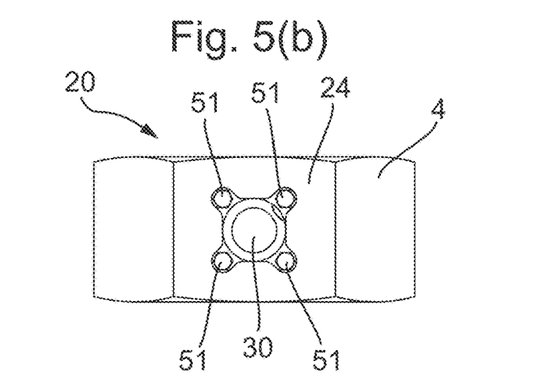
Figure 5C:
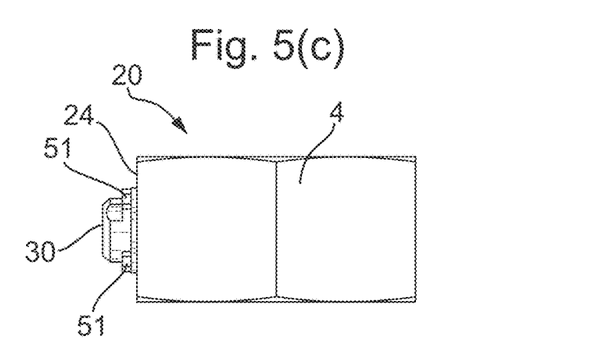
Figure 5D:
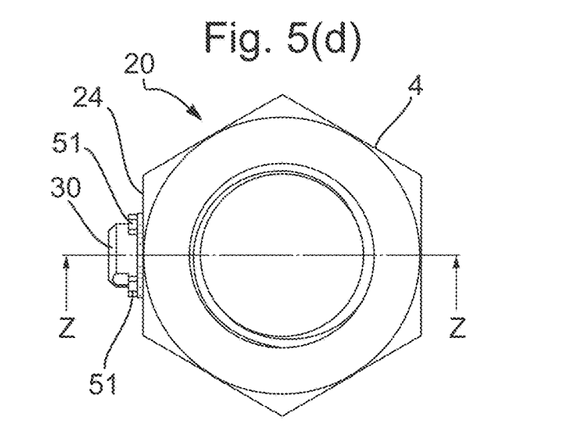
Figure 5E:
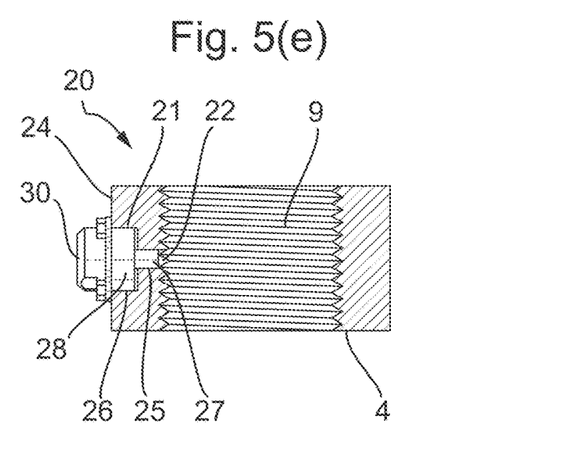

This example requires machining of the nut 4 to receive the bolts 51.

FIGS. 6(a) to 6(e) show a second specific example of the sensor assembly 20.

Figure 6A:
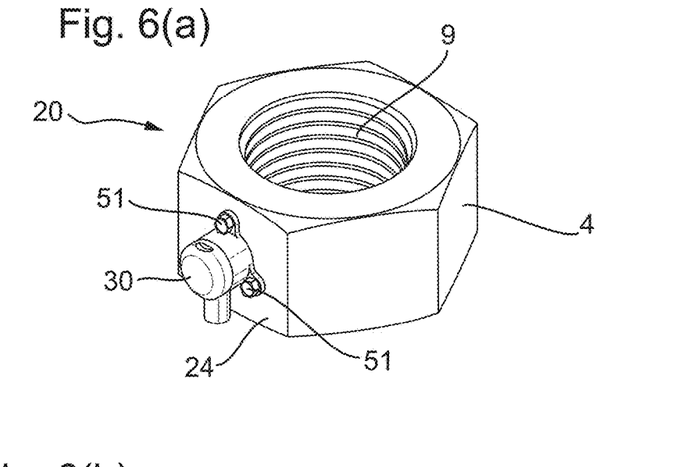
FIGS. 6(a) to 6(e) are views of a second specific example of the sensor assembly, FIG. 6(a) being a perspective view, FIG. 6(b) being a side view, FIG. 6(c) being a front view, FIG. 6(d) being a plan view, and FIG. 6(e) being a cross-sectional view taken along line z-z in FIG. 6(d)
Figure 6B:
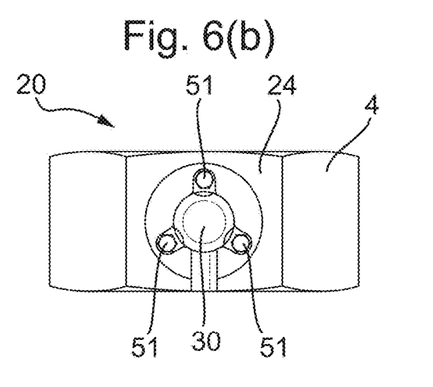
Figure 6C:
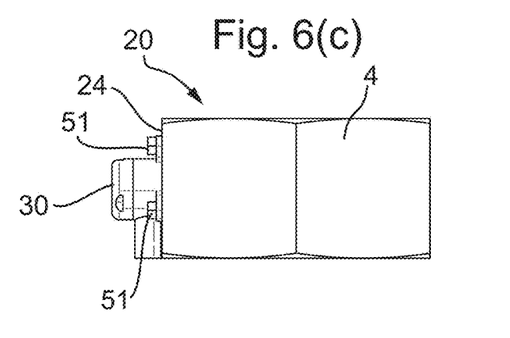
Figure 6D:
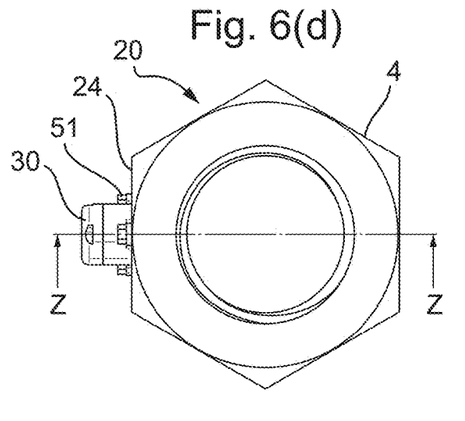
Figure 6E:
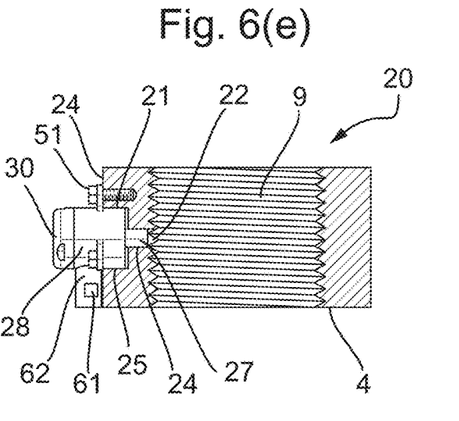

The second specific example is the same as the first specific example, as described above, except for the following modification.

The second specific example includes a further optical flow sensor 61 that is directed axially of the internal thread 9 of the nut 4 and arranged to sense relative movement of the adjacent one of the plates 2 (or more generally any object) fastened between the nut 4 and the bolt 3 when the internal thread 9 is screwed onto external thread of the bolt 3. The further optical flow sensor 61 is accommodated in an extension 62 of the housing 31 disposed outside the peripheral face 24 of the nut 4 from which the housing 31 protrudes. The extension may be adjacent the peripheral face 24 as shown in FIGS. 6(a) to 6(e), or may alternatively be spaced from the peripheral face 24, for example to image and sense of a part of the plate 2 outside a washer 10 (if present).

The further optical flow sensor 61 may have the same configuration and operation as the optical flow sensor 33, as described above, except that the further optical flow sensor 61 senses movement of the adjacent one of the plates 2 relative to the nut 4. Such relative movement of the nut 4 with respect to the plate 2 is also indicative of loosening the fastener assembly 1 but provides additional information by detecting the case that the entire fastener assembly 1 rotates without relative rotation of the nut 4 and the bolt 3, which cannot be detected by optical flow sensor 33.

More generally, the second specific example could be modified so that the further optical flow sensor 61 captures an image and senses relative movement of any object outside the nut 4

To accommodate the further optical flow sensor 61, three bolts 51 are present, but any number of bolts 51 could be used in practice.

FIGS. 7(*a*) to 7(*e*) show a third specific example of the sensor assembly 20.

In this example, the sensor unit 30 has an external thread 71 and the cavity 21 has an internal thread 72 into which the external thread 71 of the sensor unit 30 is screwed to mount the sensor unit 30 in the cavity 21. In contrast to the first specific example, in this example the cavity 21 has a the same cross-sectional area along its extent between the internal opening 22 and the external opening 23.

Figure 7A:
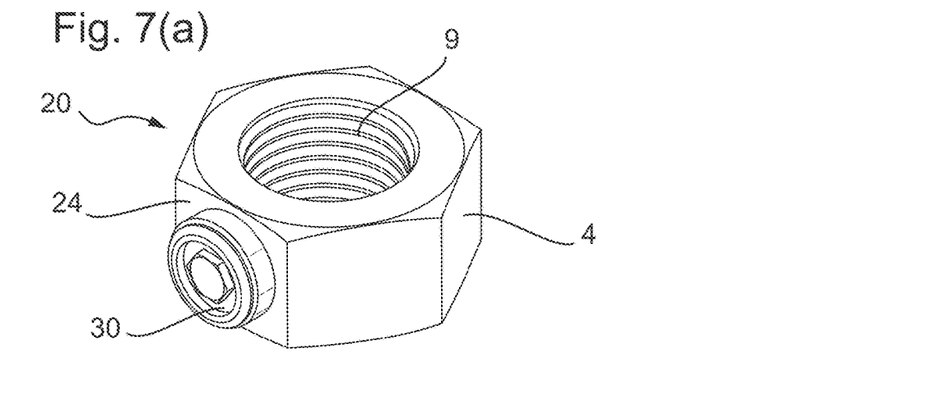
FIGS. 7(a) to 7(e) are views of a third specific example of the sensor assembly, FIG. 7(a) being a perspective view, FIG. 7(b) being a side view, FIG. 7(c) being a front view, FIG. 7(d) being a plan view, and FIG. 7(e) being a cross-sectional view taken along line z-z in FIG. 7(d)
Figure 7B:
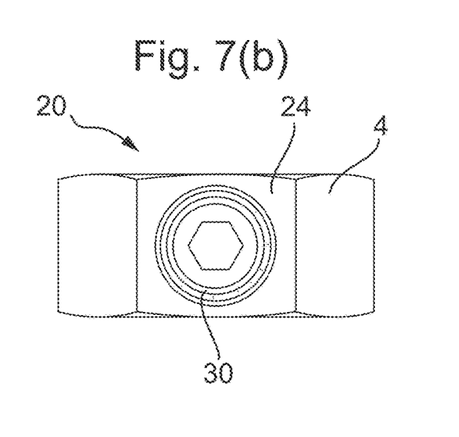
Figure 7C:
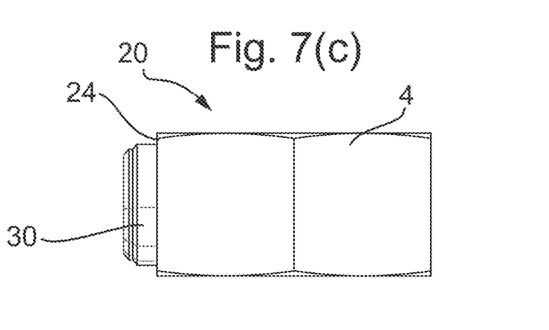
Figure 7D:
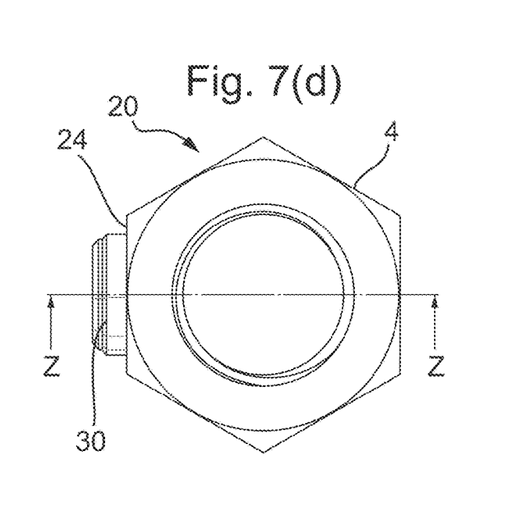
Figure 7E:
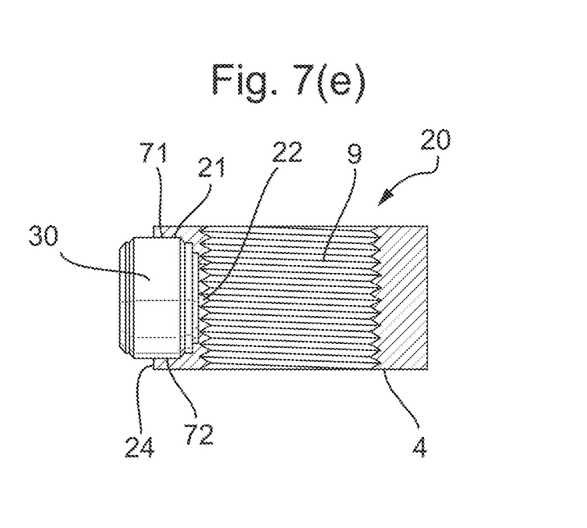

This example is of relatively low cost, but the screw-fixing needs to be robust enough to limit unscrewing which could erroneously be detected as relative movement of the external thread 6 of the bolt 3 with respect to the nut 4. To reduce the risk of this, additional fixing could be provided, for example by adhesive.

FIGS. 8(*a*) to 8(*e*) show a fourth specific example of the sensor assembly 20.

As in the first specific example, in this example the cavity 21 comprises an inner section 25 and an outer section 26 having a greater cross-sectional area than the inner section 25, the housing 31 of the sensor unit 30 having an inner part 27 fitting within the inner section 25 and an outer part 28 fitting within the outer section 26. Thus, the inner section 25 extends towards the internal opening 22 of the internal thread 9 of the nut 4 and the optical flow sensor 33 captures an image of the internal thread 9 through the inner part 28 of the housing 31.

In this example, the sensor unit 30 is held in the nut 4 by a circlip 81 which prevents fixes the sensor unit 30 axially of the cavity 21.

Figure 8A:
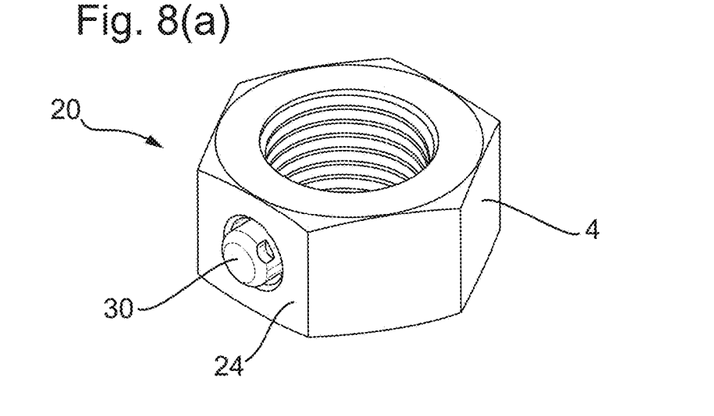
FIGS. 8(a) to 8(e) are views of a fourth specific example of the sensor assembly, FIG. 8(a) being a perspective view, FIG. 8(b) being a side view, FIG. 8(c) being a front view, FIG. 8(d) being a plan view, and FIG. 8(e) being a cross-sectional view taken along line z-z in FIG. 8(d)
Figure 8B:
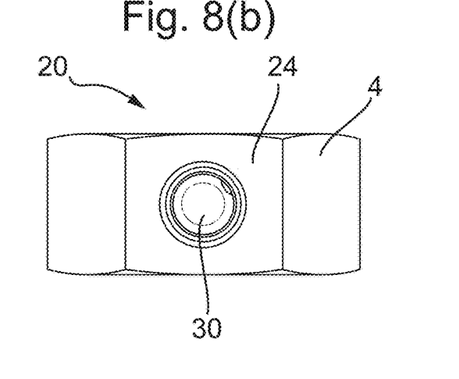
Figure 8C:
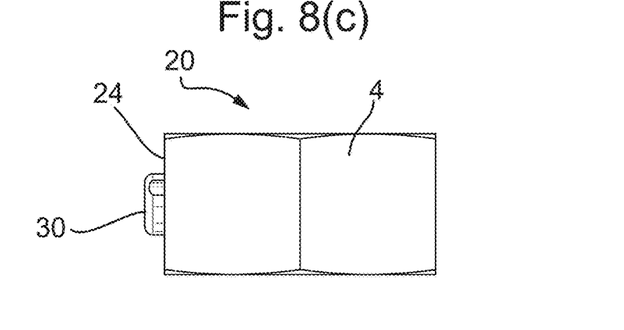
Figure 8D:
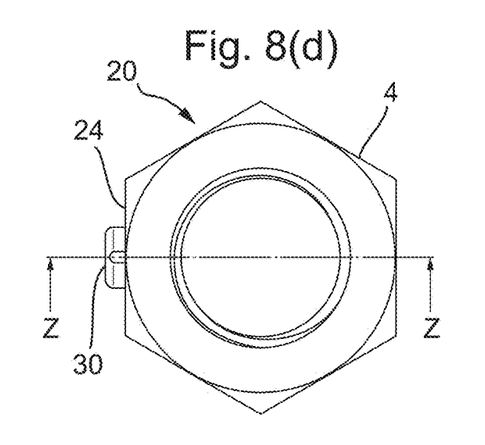
Figure 8E:
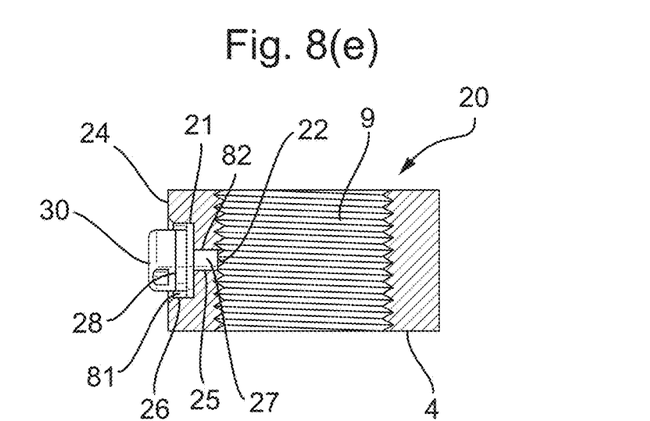

In addition, a keying arrangement 82 is provided between the nut 4 and the sensor unit 30, in this example between the inner section 27 of the cavity 21 and the inner part 28 of the housing 31, to prevent relative rotation of the nut 4 and the sensor unit 30. The keying arrangement 82 may have any suitable form, for example being a slot and key, or a polygonal periphery.

FIGS. 9(*a*) to 9(*e*) show a fifth specific example of the sensor assembly 20.

As in the first specific example, in this example the cavity 21 comprises an inner section 25 and an outer section 26 having a greater cross-sectional area than the inner section 25, the housing 31 of the sensor unit 30 having an inner part 27 fitting within the inner section 25 and an outer part 28 fitting within the outer section 26. Thus, the inner section 25 extends towards the internal opening 22 of the internal thread 9 of the nut 4 and the optical flow sensor 33 captures an image of the internal thread 9 through the inner part 28 of the housing 31.

In this example, the sensor unit 30 is fixed to the nut 4 by a pair of pins 91 (or in general any number of one or more pins 91) extending through the nut 4 and the sensor unit 30 axially of the internal thread 9 of the nut 4.

Figure 9A:
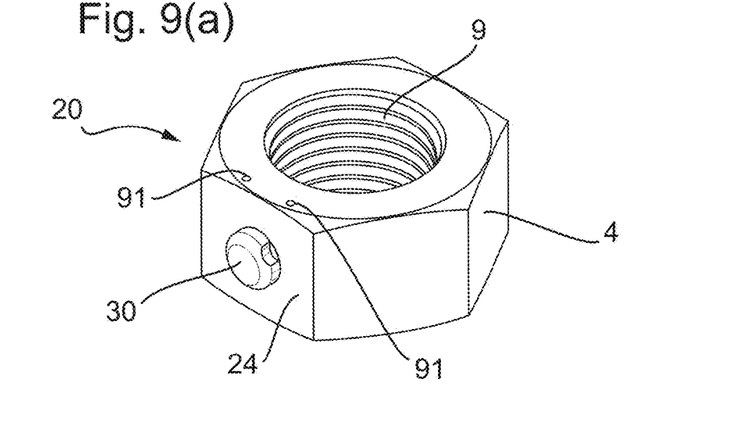
FIGS. 9(a) to 9(e) are views of a fifth specific example of the sensor assembly, FIG. 9(a) being a perspective view, FIG. 9(b) being a side view, FIG. 9(c) being a front view, FIG. 9(d) being a plan view, and FIG. 9(e) being a cross-sectional view taken along line z-z in FIG. 9(d)
Figure 9B:
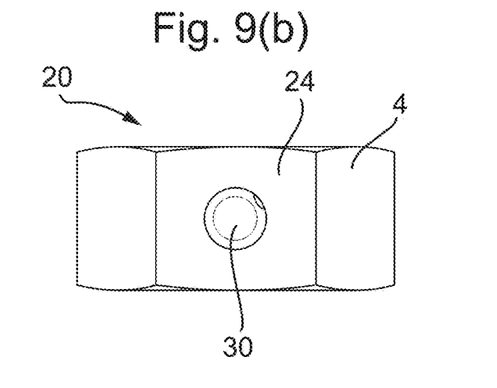
Figure 9C:
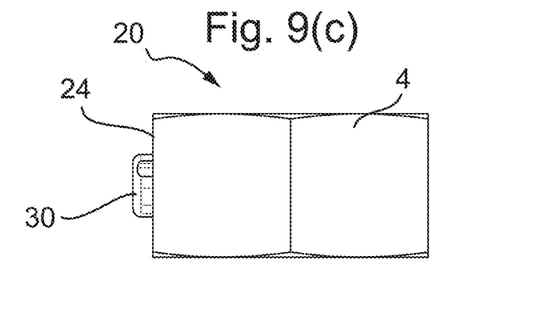
Figure 9D:
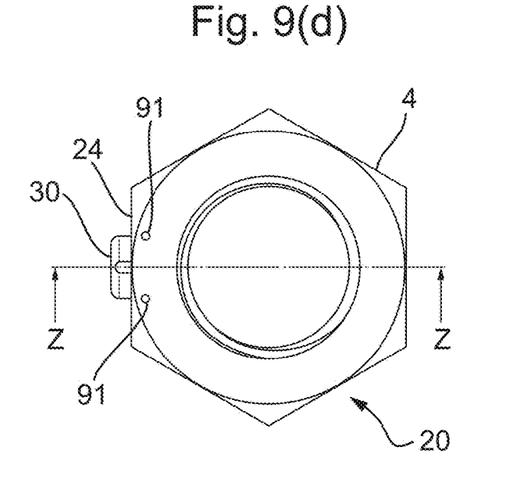
Figure 9E:
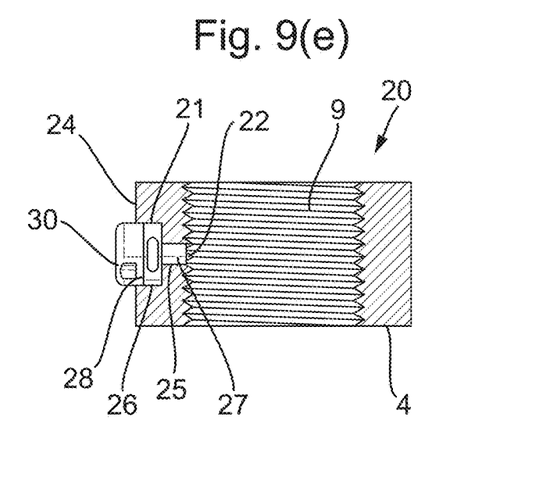

This example is of relatively low cost. The pins 91 may have any suitable form, including being split pins, spiral pins or groove pins to reduce the risk of the pins 91 being dislodged by vibration. The pins 91 may be inserted through apertures that either extending through the entirety of the nut 4 to allow removal for replacement of the sensor unit 20 or are blind such that the sensor unit 20 cannot be replaced.

FIGS. 10(*a*) to 10(*e*) are views of a sixth specific example of the sensor assembly 20.

As in the first specific example, in this example the cavity 21 comprises an inner section 25 and an outer section 26 having a greater cross-sectional area than the inner section 25, the housing 31 of the sensor unit 30 having an inner part 27 fitting within the inner section 25 and an outer part 28 fitting within the outer section 26. Thus, the inner section 25 extends towards the internal opening 22 of the internal thread 9 of the nut 4 and the optical flow sensor 33 captures an image of the internal thread 9 through the inner part 28 of the housing 31.

Figure 10A:
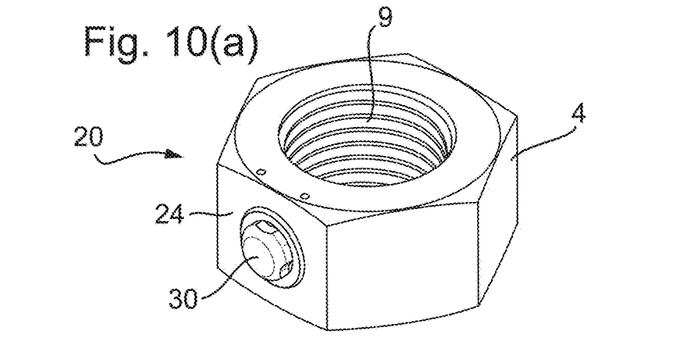
FIGS. 10(a) to 10(e) are views of a sixth specific example of the sensor assembly, FIG. 10(a) being a perspective view, FIG. 10(b) being a side view, FIG. 10(c) being a front view, FIG. 10(d) being a plan view, and FIG. 10(e) being a cross-sectional view taken along line z-z in FIG. 10(d)
Figure 10B:
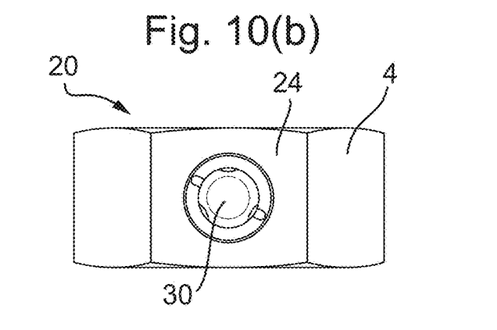
Figure 10C:
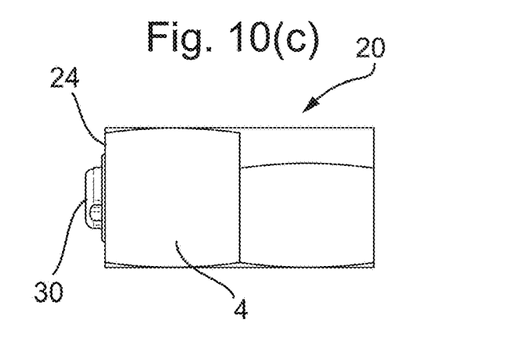
Figure 10D:
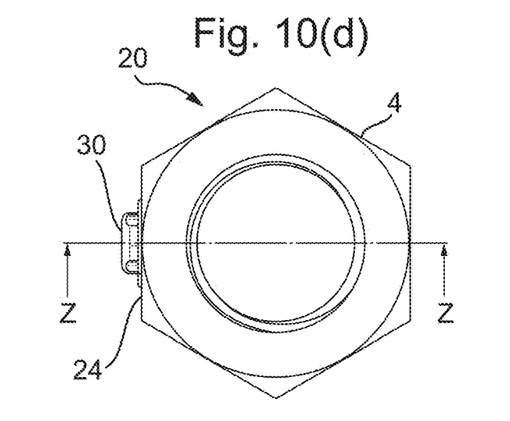
Figure 11:
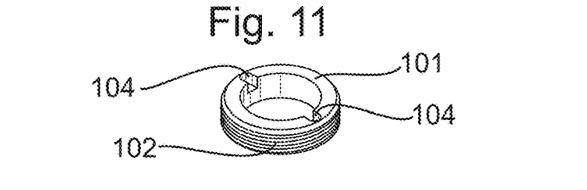
FIG. 11 is a perspective view of a rotatable collar of the sensor unit shown in FIGS. 10(a) to 10(e).

In this example and as shown in more detail in FIG. 11, the sensor unit 30 has a rotatable collar 101 that is provided around the outer part 28 of the housing 31 and is rotatable with respect to the housing 31. The rotatable collar 101 has an external thread 102 and the outer section 26 of the cavity 21 has an internal thread 103 into which the external thread 102 of the rotatable collar 101 is screwed to mount the sensor unit 30 in the cavity 21. The rotatable collar 101 may include splits 104 within the external thread 102 in order to provide a locking feature.

Figure 10E:
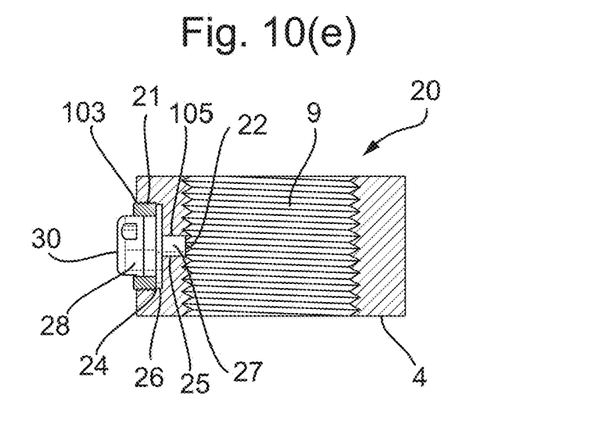

In addition, a keying arrangement 105 is provided between the nut 4 and the sensor unit 30, in this example between the inner section 27 of the cavity 21 and the inner part 28 of the housing 31, to prevent relative rotation of the nut 4 and the sensor unit 30. The keying arrangement 105 may have any suitable form, for example being a slot and key, or a polygonal periphery.

Various modifications may be made to the sensor assembly 20 described above. Some non-limitative examples are as follows.

While the first to sixth specific examples have advantageous mounting arrangements, more generally the sensor unit 30 may be mounted in the nut 4 by any other suitable means, including the use of a resilient member(s), potting compound, epoxy or adhesive.

In the above examples, the cavity 21 is enclosed within the nut 4 apart from the internal opening 22 through which sensing occurs and the external opening 23 through which the sensor unit 30 is inserted into the cavity 21, but the cavity may take other forms. For example, the cavity 21 may be a recess formed in one of the annular surfaces of the nut 4.

In the above examples, there is a single optical flow sensor 33 which senses the external thread 9 of the bolt 3 (and in the second specific example a single further optical flow sensor 61 that senses the plate 2). In some embodiments there may be plural optical flow sensors 33 which senses the external thread 9 of the bolt 3 and/or plural further optical flow sensors 61 that senses the plate 2 or more generally another object outside the nut 4. The provision of plural optical flow sensors sensing the same object (i.e. external thread 9 of the bolt 3 and/or object outside the nut 4) may provide advantages in terms of redundancy and/or sensitivity of sensing.

The invention claimed is:

1. A sensor assembly for a fastener assembly comprising a nut and a bolt, the sensor assembly comprising:
   the nut of the fastener assembly, the nut having an internal thread for screwing onto an external thread of the bolt and a cavity; and
   a sensor unit mounted in the cavity in the nut, the sensor unit comprising an optical flow sensor arranged to capture an image of the external thread of the bolt and to sense relative movement of the external thread of the bolt when the internal thread is screwed onto the external thread of the bolt.

2. A sensor assembly according to claim 1, wherein the cavity has an internal opening in the internal thread of the nut, and the optical flow sensor is arranged to capture an image of the external thread of the bolt through the internal opening in the internal thread of the nut.

3. A sensor assembly according to claim 2, wherein the internal opening in the internal thread of the nut has an area of at least 0.5 cm².

4. A sensor assembly according to claim 1, wherein the cavity has an external opening in a peripheral face of the nut.

5. A sensor assembly according to claim 4, wherein the sensor unit protrudes from the external opening.

6. A sensor assembly according to claim 4, wherein the cavity comprises an inner section and an outer section having a greater cross-sectional area than the inner section.

7. A sensor assembly according to claim 1, wherein the cavity is a machined cavity.

8. A sensor assembly according to claim 1, wherein the nut is of size M20 or greater.

9. A sensor assembly according to claim 1, wherein the optical flow sensor comprises an image sensor.

10. A sensor assembly according to claim 9, wherein the image sensor is a CMOS image sensor.

11. A sensor assembly according to claim 9, wherein the image sensor has a global shutter.

12. A sensor assembly according to claim 9, wherein the optical flow sensor further comprises a lens arranged to focus the image of the external thread of the bolt on the image sensor.

13. A sensor assembly according to claim 1, wherein the sensor unit further comprises a light source arranged to provide illumination through the internal opening in the internal thread of the nut.

14. A sensor assembly according to claim 1, wherein the sensor unit further comprises a diffuser arranged in front of the light source.

15. A sensor assembly according to claim 1, wherein the sensor unit further comprises a processor arranged to process an output of the sensor to detect loosening of the fastener assembly and to output a status signal representing the status of the fastener assembly.

16. A sensor assembly according to claim 15, wherein the sensor unit further comprises a wireless communication unit arranged to communicate the status signal.

17. A sensor assembly according to claim 1, wherein the sensor unit further comprises a further optical flow sensor arranged to capture an image of an object outside the nut and arranged to sense relative movement of the object.

18. A sensor assembly according to claim 17, wherein the further optical flow sensor is directed axially of the internal thread of the nut, said object being an object fastened between the nut and the bolt when the internal thread is screwed onto the external thread of the bolt.

19. A sensor assembly according to claim 1, wherein the sensor unit is fixed to the nut by at least one mechanical fixing fixed to a peripheral face of the nut.

20. A sensor assembly according to claim 1, wherein the sensor unit is fixed to the nut by at least one pin extending through the nut and the sensor unit in a direction axially of the internal thread of the nut.

21. A sensor assembly according to claim 1, wherein the sensor unit is held in the nut by a circlip.

22. A sensor assembly according to claim 21, wherein the nut and the sensor unit have a keying arrangement arranged to prevent relative rotation of the nut and the sensor unit.

23. A sensor assembly according to claim 1, wherein the sensor unit has an external thread and the cavity has an internal thread into which the external thread of the sensor unit is screwed.

24. A sensor assembly according to claim 23, wherein the sensor unit comprises a housing in which the sensor unit is mounted and a rotatable collar on which an external thread is formed.

25. A sensor assembly according to claim 24, wherein the nut and the housing have a keying arrangement arranged to prevent relative rotation of the nut and the sensor unit.

\* \* \* \* \*